United States Patent [19]
Williams et al.

[11] Patent Number: 5,883,891
[45] Date of Patent: Mar. 16, 1999

[54] METHOD AND APPARATUS FOR INCREASED QUALITY OF VOICE TRANSMISSION OVER THE INTERNET

[76] Inventors: Wyatt Williams, 15005 Beacon Ridge Dr., Seneca, S.C. 29678; Joel Libove, 34 Canyon View Dr., Orinda, Calif. 94563

[21] Appl. No.: 641,239

[22] Filed: Apr. 30, 1996

[51] Int. Cl.⁶ .......................... H04L 12/28; H03M 13/00; H04M 11/00
[52] U.S. Cl. .......................... 370/356; 370/394; 370/473; 371/37.02; 379/90.01
[58] Field of Search .................... 370/352, 353, 370/356, 380, 389, 394, 396, 401, 473, 485, 427, 435, 450, 465, 37.01, 37.02, 37.12; 379/90.01, 93.01, 93.05, 93.09, 100.15, 100.16

[56] References Cited

U.S. PATENT DOCUMENTS

| | | | |
|---|---|---|---|
| 4,771,425 | 9/1988 | Baran et al. | 370/85 |
| 5,526,353 | 7/1996 | Henley et al. | 370/60.1 |
| 5,553,063 | 9/1996 | Dickson | 370/29 |
| 5,673,265 | 9/1997 | Gupta et al. | 370/432 |
| 5,710,756 | 1/1998 | Pasternak et al. | 370/216 |

*Primary Examiner*—Chau Nguyen
*Assistant Examiner*—Allan Hoosain
*Attorney, Agent, or Firm*—Eliot S. Gerber

[57] ABSTRACT

To satisfactorily transmit two-way speech on digital computer networks, such as the Internet, it is necessary to reduce unpredictable delays due to variations in loading, routing and other factors. The present invention transmits extra packets of specially computed data along with the data representing speech. These extra packets are used at the receiving server to reconstruct any missing or late data packets. In one embodiment, any single packet of missing data in a stream of packets may be reconstructed. In additional embodiments, multiple packets of missing data may be reconstructed. This method is particularly suited to eliminating or reducing delays in networks in which data is sent down multiple diverse paths. Unlike prior art, it is not necessary to send full sets of redundant data down these diverse paths. The present invention significantly reduces latency with only a fraction of the added network bandwidth required with prior art methods that use full sets of redundant data.

15 Claims, 5 Drawing Sheets

| D0 | D1 | D2 | D3 | CHECK |

FIG.2A

| D0 | D1 | MISSING PACKET | D3 | CHECK |

FIG.2B

| D0,0 | D0,1 | D0,2 | D0,3 | D0,4 | C0,N |
| D1,0 | D1,1 | D1,2 | D1,3 | D1,4 | C1,N |
| D2,0 | D2,1 | D2,2 | D2,3 | D2,4 | C2,N |
| D3,0 | D3,1 | D3,2 | D3,3 | D3,4 | C3,N |
| D4,0 | D4,1 | D4,2 | D4,3 | D4,4 | C4,N |
| CN,0 | CN,1 | CN,2 | CN,3 | CN,4 | CN,N |

FIG.3A

| D0,0 | D0,1 | D0,2 | D0,3 | D0,4 | C0,N |
| D1,0 | D1,1 | D1,2 | D1,3 | D1,4 | C1,N |
| D2,0 | D2,1 | D2,2 | D2,3 | D2,4 | C2,N |
| D3,0 | D3,1 | D3,2 | D3,3 | D3,4 | C3,N |
| D4,0 | D4,1 | D4,2 | D4,3 | D4,4 | C4,N |
| CN,0 | CN,1 | CN,2 | CN,3 | CN,4 | CN,N |

| ROUTE ID | NODE 1 | NODE 2 | NODE 3 | NODE 4 | NODE 5 | NODE 6 |
|---|---|---|---|---|---|---|
| 1 | 123.73.732 | 101.34.732.01 | 311.83.01.03 | 0 | 0 | 0 |
| 2 | 123.73.732 | 22.521.22.01 | 155.29.16.13 | 0 | 0 | 0 |
| 3 | 33.147.16.8 | 101.34.732.01 | 22.751.32.2 | 155.23.16.13 | 0 | 0 |
| 4 | 123.73.732 | 101.34.732.01 | 155.29.16.13 | 0 | 0 | 0 |

FIG. 6

| CODE(68) | LENGTH | POINTER | OFLOW | FLAG |
|---|---|---|---|---|
| (STANDARD IP HEADER DATA) | | | | |
| 123.73.732 | | | | |
| 83422 | | | | |
| 101.34.732.01 | | | | |
| 83467 | | | | |
| 311.83.01.03 | | | | |
| 83502 | | | | |
| (END OF PACKET) | | | | |

| Route ID | Node Count | Traversal Time | Drop Count | Repeat Count | Weight Factor | In Use |
|---|---|---|---|---|---|---|
| 1 | 3 | 238 | 0 | 4 | 143 | 1 |
| 2 | 3 | 84 | 0 | 0 | 252 | 0 |
| 3 | 4 | 192 | 3 | 1 | 1536 | 1 |
| 4 | 3 | 255 | 1 | 2 | 510 | 0 |

FIG.7

| Route ID | Node Count | Drop Count | Repeat Count | Weight Factor | In Use |
|---|---|---|---|---|---|
| 1 | 3 | 0 | 4 | 143 | 1 |
| 2 | 0 | 0 | 0 | 252 | 0 |
| 3 | 4 | 3 | 1 | 1536 | 1 |
| 4 | 5 | 1 | 2 | 510 | 0 |

FIG.8

METHOD AND APPARATUS FOR INCREASED QUALITY OF VOICE TRANSMISSION OVER THE INTERNET

FIELD OF THE INVENTION

The present invention relates to duplex voice communication using digital transmission over the Internet communications network.

BACKGROUND OF THE INVENTION

At the present time a number of companies commercially offer computer hardware and software products which permit computer users to talk to each other using voice communication, and their computers, over the Internet. The Internet is a network using digital data and a large number of computers which communicate with each other over various types of communication channels, including data telephone lines, such as ISDN (Integrated Services Digital Network) T1, T2, T3 channels.

The digital data is organized into a bitstream consisting of packets. A packet is a series of bits comprising communicated data and a header, which gives control and/or address information, such as the source and destination of the packet.

The user's voice, an analog signal, is converted into digital data. For example, the analog voice signal is sampled at 8,000–100,000 times a second, and the voltage level at each sample is represented by a digital number. The voice Internet telephony software, which is commercially available, converts the voice signal to digital data, compresses it and transmits it as packets over a telephone line to an Internet server (provider or host server) which is generally a high speed and high capacity computer connected to a high bandwidth communication channel as part of the Internet.

For example, a telephone full duplex (two parties may talk simultaneously) real time voice conversation may be initiated over the Internet from one computer to another. Both computers generally require the same Internet telephony software, a microphone, a soundcard and a minimum of processor speed (Intel 486 or Pentium (™)) modem (14.4 bps—bits per second), software (Microsoft 3.1 Windows or higher) and connection to an Internet provider. Both computers must be on line at the same time; which requires a pre-arrangement or a separate telephone toll phone call. Software for that type of system is available from IDT, Hackensack, N.J. ("Net 2 Phone" ™), Vocal Tec, Inc. ("Internet Phone" ™), or Digiphone ™ and others.

It has also been announced, in February 1996, by Dialogic Inc.,.Parsippany, N.J., and Vocal Tec Inc., Northvale, N.J., that, in a product available in about the third quarter 1996, users may place voice calls from their PCs (Personal Computers) or a telephone connected to a gateway server, to an Internet "hopoff" server close to the person being called. The hopoff server would place a local call to the person being called. The telephone-to-telephone system would require "back-to-back" servers, i.e., each telephone is connected to a server.

The use of the Internet, in the United States, for voice communication, is presently being opposed by petition to the FCC (Federal Communications Commission) filed by America's Carriers Telecommunication Association. Data packets traverse the Internet by being routed from one node to the next. Each of these hops takes the packet closer to its destination. Each node along the route is designated by a globally unique IP address. Each node in the route looks at the destination address contained in the header of an IP packet and sends the packet in the direction towards its destination. At any time, a node along a particular route can stop accepting, or block one or more packets. This may be due to any number of reasons: congestion, maintenance, node crash, etc. Each routing node constantly monitors its adjacent nodes and adjusts its routing table when such problems occur. As a result, sequentially numbered packets may take different routes as they traverse the Internet.

The audio quality of duplex phone conversation over the Internet is often poor because of delays of transmission of packets, lost packets and lost connections. The delays are unpredictable and are usually caused by the dynamically changing data loads on the network and the changing and often long routes through which the data must pass. Existing methods for reducing this delay problem have included the use of (1) dedicated transmission lines, (2) permanent virtual circuits in which a route is reserved for the duration of the real-time data transmission, and (3) redundantly sending all of the critical data so that the delay experienced by the user will be only the delay of the shortest path.

Methods 1 and 2 above are undesirable for two-way voice communications due to the high cost of the dedicated path (channel) which must be present during the entire conversation. Additionally, these methods (1) and (2) are not universally available to most Internet users. Method (3) is undesirable because it wastes network resources by sending multiple copies of the data, although long delays along a given path are generally only occasional.

The recent increase in consumer interest in the Internet, for example the downloading of graphics using the World-Wide Web, has placed an increased demand for transmission and processing time. It is believed, by some, that such increased demand will result in even poorer audio duplex phone quality.

SUMMARY OF THE INVENTION

The present invention seeks to improve the audio quality of voice communication over the Internet. It provides such quality by reconstituting delayed and/or missing packets based upon the packets which arrive in time. The system is "robust" because packets constituting a matrix (a group of 3–20 packets) are deliberately transmitted over multiple routes. If one route is subject to delays, or loses packets, the lost or delayed packages may be fully reconstituted.

The server receiving the phone call from a caller (host computer) uses a software program which arranges each set of incoming voice packets into vertical (imaginary), xy matrix (2-dimensional) or a 3-dimensional matrix. For example, a matrix consists of rows and columns of 25 packets formed into 5 rows and 5 columns. A sixth row is a check packet and is based on the 5 packets in its column. That server (source node) transmits the data packets and check packets over the Internet to another server (destination node) who places a telephone call over the local telephone network to the callee.

The destination host server uses a simple and fast procedure (algorithm), and if any packet, or even an entire row of packets, is delayed or otherwise missing (missing packets), reconstitutes the missing packet. The effect, to the listener, is as if the missing packets had arrived on time. The listener hears a high quality and exact replica of the entire original voice; without any missing segments, i.e., without missing packets.

The originating voice is transmitted by telephone to a server, for example, a computer of an Internet service provider. The server (source node) converts the voice into digital data and forms that data into packets. Each packet is formed with a header having usual origination and destination address. In addition, and novel in this context, each header has a series of intermediate nodes which defines its route. In this way the best available route may be selected and a number of different routes may be preselected for each group of packets.

Preferably the best available route is obtained by transmitting "echo packets" from a source node (source server) to a destination node (destination server). The echo packets record the addresses and time of each node (intermediate node) through which they are transmitted. The echo packets are re-transmitted back to the source node. The source node compares a number of returned echo packets which have, by random forwarding, been transmitted over different routes, to select the best available route. Alternatively, different routes may be manually preconfigured.

Although the preferred embodiment directs the packets of a group along different routes it is possible to use the present invention, using check packets, with random route selection or without any route selection by the originating server. It is also possible to use multiple route selection, of the present invention, without using check packets. However, with or without route selection, the check packets are useful to substitute (reconstitute) packets in the event any of the group of packets are missing or delayed.

In one embodiment, a group of packets consists of about 25 packets representing 250 ms (milliseconds) of speech and those packets are formed, under software program control, by the receiving server, into a 5×5 matrix (xy matrix). In addition, 5 check packets are transmitted by the sending server and formed as a bottom row of the 5×5 matrix by the receiving server.

During the full duplex voice conversation the server connected to the telephone of the caller will be the sending server when the caller is talking and it will be the receiving server when the person called is talking. Similarly, when the person called is talking he is connected to a server which acts as the sending server and when the caller talks that server acts as the receiving server.

The definition of "delay", to define a missing packet, depends on the efficiency of the routes, although it may be set on the basis of experience. For example, in a 5×5×5 (3-dimensional) matrix of voice data packets for a 250 ms segment, the delay is set at 50 ms. Consequently, any packet that does not arrive within 300 ms of the start of the segment is considered delayed (missing) and is reconstituted.

"Source routing" is the technique in which a source node (source host server) specifies a complete or partial route that a packet must take as it traverses the Internet. The header of a packet has a list of intermediate node addresses, in sequence, to which the packet is directed. Each intermediate node directs the packet to the next intermediate node in the sequence. The "hop" (count) for a route is the number of nodes (router computers) that the packet must pass through to reach its destination. A "data packet" contains data and minimal control information. Usually a data packet would have 32 bytes as a header and 512 bytes of data. A control packet does not contain any data. The check packets are one form of control packets. An "echo route packet" is a control packet that collects the node IDs (identification numbers—addresses) in its route from the source to the destination node, i.e., it contains a listing of node IDs through which it has been transmitted. A "detect route packet" is a control packet that uses source routing to determine if a particular route from the source to the destination is reliable.

BRIEF DESCRIPTION OF THE DRAWINGS

The inventors' presently known best mode of practicing the present invention is described in the following detailed description, which should be considered in conjunction with the accompanying drawings.

In the drawings.

DETAILED DESCRIPTION

Figure 1A:
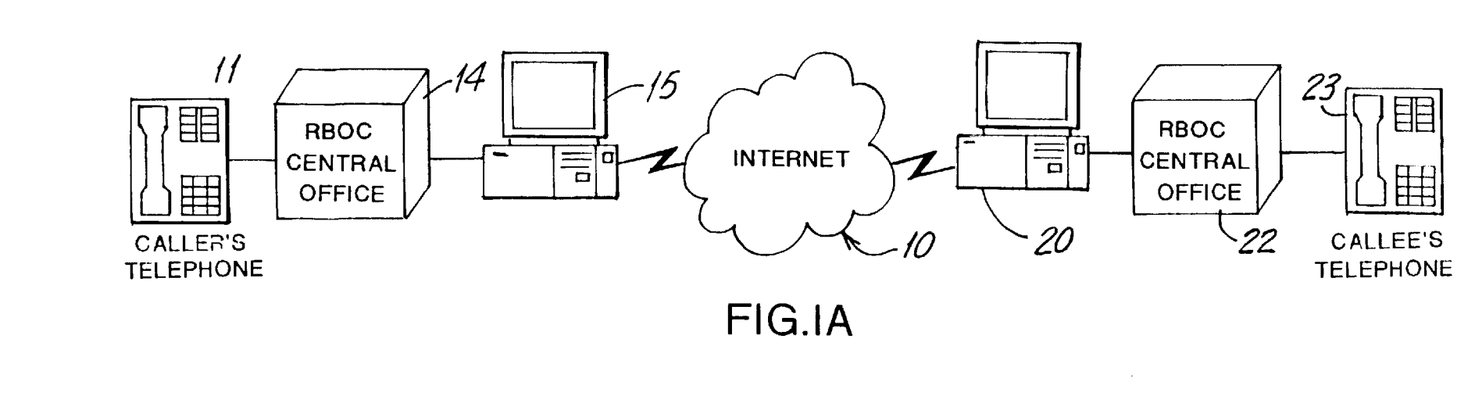
FIG. 1A illustrates the general system of the invention.
Figure 1B:
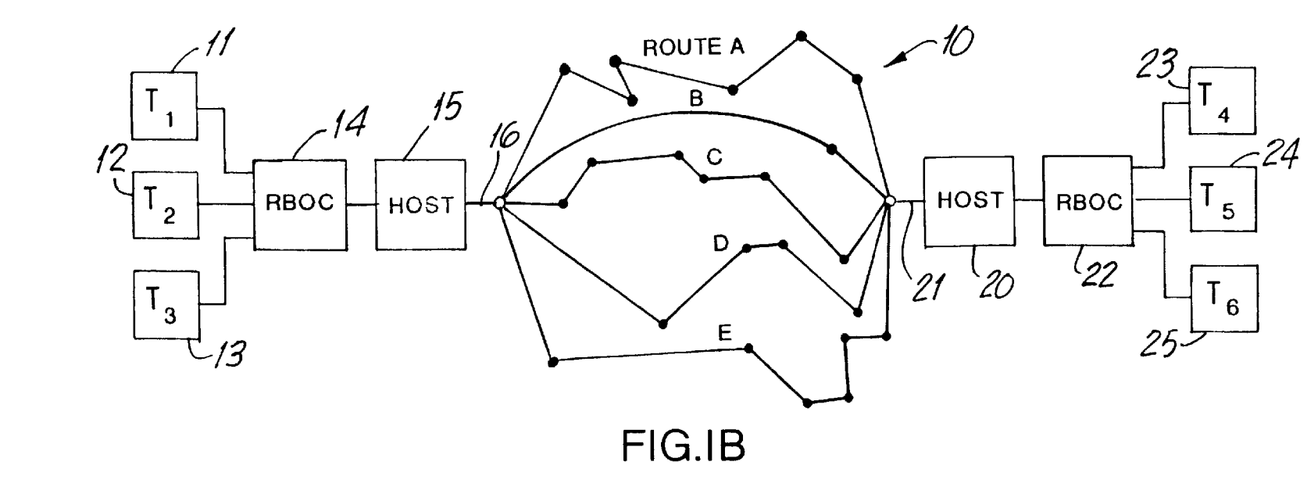
FIG. 1B illustrates the sending of data packets by multiple paths (multiple communication channels)

FIG. 1B illustrates how packets of data may be routed via a multiplicity of parallel routes (separate communication channels) through the Internet. In this way, the voice (message) being sent is broken into a number of packets and each one is sent over a different route. If any one route is delayed, the entire message is not delayed. However, if packets on a particular route are delayed, then the missing data will create a gap or other disturbance to the message. This invention serves to prevent one or more such missing data groups from adversely affecting the quality of the voice.

As shown in FIGS. 1A and 1B, the calling conventional voice telephones 11–13 ($T_1$–$T_3$), which are the "clients", are connected through telephone switch 14 to the host server 15, preferably a Internet service provider (ISP). The telephones 11–13 and switch 14 are preferably part of the public telephone system, in the United States a RBOC (Regional Bell operating Company), although alternatively or additionally it may be a private voice telephone system. The host server 15 is connected to the Internet 10 through a high digital bandwidth communication line 16, for example, a leaded telephone T1 line (DS1–1.5 M bps) or a plurality of ISDN (Integrated Services Digital Network) lines (128K bps). The Internet 10 has, at one moment in time, routes A–E having intermediate nodes (black dots). The receiving host server 20 is connected to the Internet 10 through high bandwidth line 21 and is connected to telephone switch 22 which is connected, in turn, to telephones 23–25 ($T_4$–$T_6$). The telephones 11–13 and 23–25 may be considered to represent all the telephones in an area; for example telephones 11–13 may be considered to represent all the telephones in New York City and telephones 23–25 may be considered to represent all the telephones in Los Angeles.

The servers 15 and 20 are high-speed and high-capacity computers. For example, the server may be a Pentium Pro (™) workstation which runs Windows NT (™) operating system. The packets use IP (Internet Protocol) addresses (header) which are 32 bits long and consist of a destination identifier, a host identifier, control data and also includes a list of intermediate node addresses. The voice data may be encrypted. Preferably the speech is compressed. For example, the "Tool Vox" (™) software from Vox Ware, Inc., Princeton, N.J., claims to compress speech over the Internet at rates as high as 53 to 1. The RTP (Realtime Transport Protocol), which defines how the Internet will carry time-sensitive data packets (real time data), such as voice, is also preferably used.

The host servers 15 and 20 are provided with hardware cards, with at least one channel per card, which converts voice (analog) to digital data, compresses the speech and formats the digital data into Internet protocol packets (header plus data, typically of 512 bytes). Preferably the cards are based on DSP chips (Digital Signal Processing integrated circuits) such as those available from Dialogic, Inc., Parsippany, N.J. For example, a suitable card would have 16 ports (16 channels) and a server may have 6 such cards (96 channels).

Figure 2A:
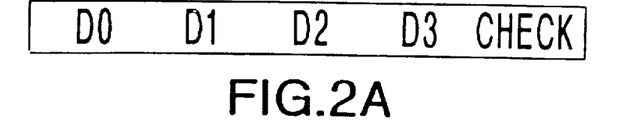
FIGS. 2A and 2B illustrate the first embodiment of the invention and show a row of data packets in which a single extra packet of check data is able to replace any single packet of late or missing data.
Figure 2B:
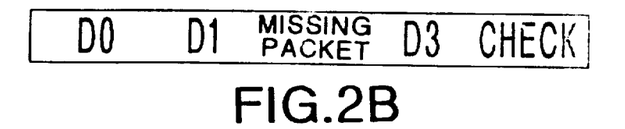

FIGS. 2A and 2B illustrate how a fraction of a second of speech may be broken down into a number of packets each of which can be sent via a different route to the destination. In addition to the four data packets D0, D1, D2 and D3, a specially computed check packet is also formulated by the sending server (source node). The check packet contains sufficient information so that if any single data packet is missing (or so late as to be unusable for generating the real-time speech segment of interest), the information in the check packet is used to rapidly reconstruct the data in the missing packet.

There are a variety of possible coding schemes for the check packet which can be used to reconstruct missing data in any one packet. The preferred and highly effective scheme is to "Exclusive OR" the respective bits in a given position in all of the data packets together, to generate the check bit for that position. This is then repeated for all of the data bits in the packet group. For example, if each packet has 4096 bits, the check packet will also have 4096 bits. The check bits are calculated as follows:

|                | BIT 0            | BIT 4096 |
|----------------|------------------|----------|
| DATA PACKET 0  | 001010011101010 ..... | 11110    |
| DATA PACKET 1  | 011001010100110 ..... | 00111    |
| DATA PACKET 2  | 001010011101010 ..... | 11110    |
| DATA PACKET 3  | 101100010100101 ..... | 01101    |
| CHECK PACKET   | 110101000000011 ..... | 01010    |

Note that for each bit position, the corresponding bit of check data is simply the Exclusive OR of the four data bits. For example, in the BIT O position data packets 0 through 3 have data bits 0,0,0, and 1 and the Exclusive OR of 0,0,0 and 1 is 1. Another way of expressing this is that the check bit is 1 if there are an odd number of 1s and the check bit is 0 if there are an even number of 1s and also if all the bits are O.

If any one data packet is missing or delayed, its data can easily be reconstructed using the remaining data packets and the check packet. For example, if data packet 2 is missing, BIT O of that data packet must have been a O, since this is the only way that there could be an odd number of 1s in BIT O of the four packets. A similar inference could be done for BIT 1, BIT 2, and all of the rest of the 4096 bits in the packet. In fact, an easy way for the server computer to compute the missing packet is simply to "Exclusive OR" all of the BIT O data for the three packets that it has received with the BIT O data in the check packet that it also received. The result will automatically generate the correct BIT O data for the missing packet. In a similar manner, BIT 1 data for the three packets and the BIT 1 data in the check packet may be Exclusive ORed to create the Bit 1 data for the missing packet, and so on for BIT 2, 3, etc.

Figure 3A:
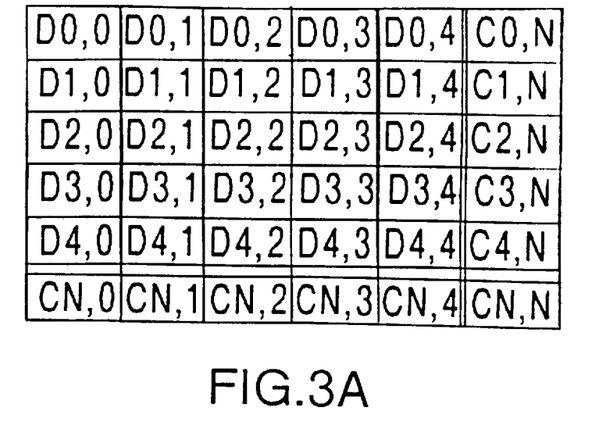
FIGS. 3A and 3B illustrate a matrix of data packets capable of replacing any two packets of late or missing data, and further capable of replacing most instances of three or more missing packets of data.

The method of FIGS. 2A and 2B allows any single missing data packet, regardless of position in the data stream, to be reconstructed. However, there are times when multiple packets may be lost or unacceptably delayed. For this reason, a two-dimensional matrix of data and check packets may instead be used, as illustrated by the example of FIG. 3A. In this example, we use a frame (matrix) of 25 data packets, DO, O, DO,1, D0,2 . . . , D4,4. For each row and column there is a check packet. For example, CO,N is the row bitwise exclusive OR of data packets DO,O, DO,1, DO,2, DO,3 and DO,4. Therefore, any missing packet in this row may be reconstructed using check packet CO,N, just as in the earlier example of FIG. 2. A separate check packet is used for the other four rows. Even if there is a single missing packet in every one of the rows, the data can be recovered, since there is a separate check packet for each row. In fact, error recovery is further enhanced by also having a check packet for each column of data packets. For example, CN,O is the bitwise exclusive OR of data packets DO,O, D1,0, D2,0, D3,O and D4,O. CN,0 is obtained from the bits of packets DO,O, D1,0, D2,0, D3,O and D4,O as in the table above showing the calculation of the check bits. Therefore, any missing packet in this column may also be reconstructed. The above scheme guarantees that any two or more missing or late data packets may be reconstructed, regardless of which two are missing. Any entire row or any entire column may also be reconstructed, since in either case there will be a full set of check packets which will cover the missing packets.

The overhead (additional packets) for correcting errors in this example is only 44%. Hence, the network needs to only carry 44% extra data to be able to correct a single missing or late data packet. This overhead is more if there are fewer data packets per check packet, and the overhead is less if there are more data packets per check packet. For example, if the routes have relatively few delays, a 2-dimensional matrix may be of 10 columns with one check packet for each column.

Figure 3B:
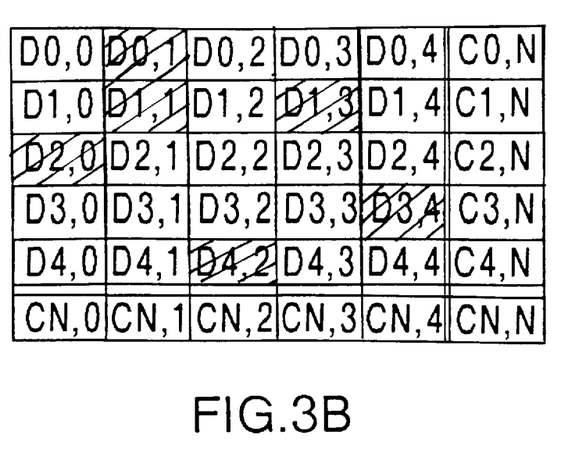

There are a large number of cases in which the method illustrated in FIG. 3A will be able to correct many more than two missing packets. In the example of FIG. 3B, five data packets are fully recoverable. This is because any data packet is recoverable as long as it is either (a) the only missing packet in row or (b) the only missing packet in a column. Therefore, there are two separate possibilities for recovery of a given packet—the row and column check packet corresponding to that packet. Hence, in the example of FIG. 3B, block D1,3 may be reconstructed despite the fact that D1,1 is also missing and therefore the check packet D1,N is therefore useless. The ability to correct packet D1,3 is still guaranteed because check packet DN,3 may be used to correct it. This is important because some of the check packets themselves may be missing, i.e., delayed.

The overhead for correcting errors in this example of FIG. 3 is only 44%. Hence, the network needs to only carry 44% extra data to be able to correct all cases of one or two missing or late data packets. This overhead is more if there is a smaller matrix of data packets and the overhead is less if there is a larger matrix of data packets. For example, in a 10×10 matrix of data packets the overhead is only 21%. However, for some applications, larger matrices would be disadvantageous because these matrices would represent too long a segment of speech, and hence the average delay in communicating the speech from one station to another would actually increase. A solution to this problem would be to have each of these data packets smaller (e.g., 1024 bits per packet, instead of 4096).

Figure 4:
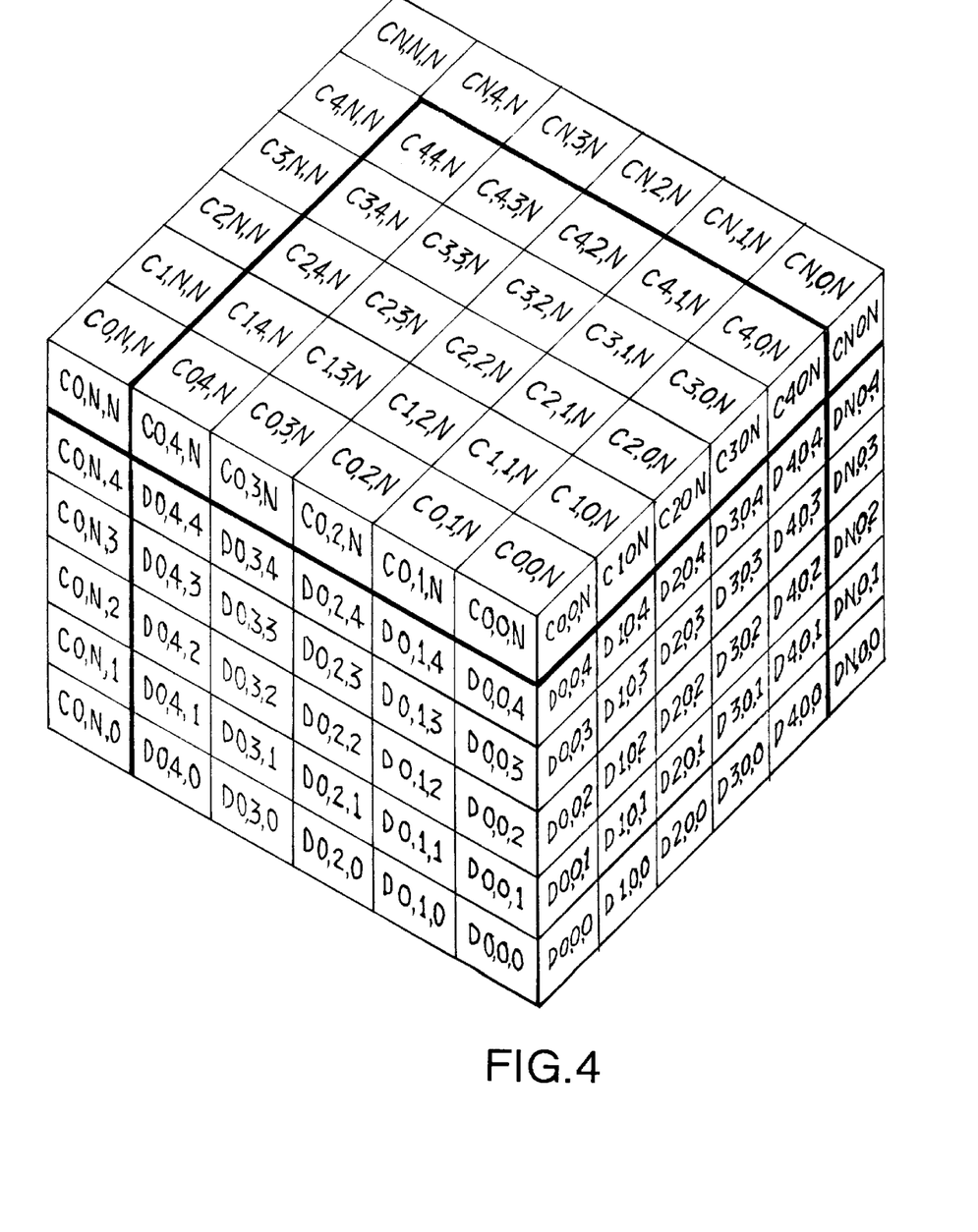
FIG. 4 illustrates a cubic arrangement of data packets capable of replacing any three packets of late or missing data, and further capable of replacing most instances in which four or five packets of data are missing.

FIG. 4 illustrates a three-dimensional matrix which works under the same principle as the earlier described methods. With the method of FIG. 4, any three missing or delayed packets may be recovered, as well as any row plus any column of packets, or any slice (a full 5×5 matrix of rows and columns of data) may be fully recovered. In addition, almost any four, five or six missing data packets may be fully recovered, and in some cases many more data packets may be recovered depending upon the position of the missing packets within the matrix.

The overhead of this three-dimensional method of FIG. 4 is slightly higher than that of the two-dimensional method of FIG. 3, at least for the case shown which has 125 data packets. However, for larger number of data packets, the efficiency increases and will eventually surpass that of FIG. 2. Small packet sizes are needed for the three-dimensional method of FIG. 4, otherwise unacceptably long speech sequences will transpire before correction of missing packets can take place.

An alternative to the "Exclusive OR" algorithm is to use the sum of the bits in each column of a matrix of packets. The check packet, in this case, would be twice as long as a data packet.

In all of the methods described above, the degree of effectiveness will depend upon the degree of diversity of routing of packets. The ideal scenario is to route all data and check packets via a forced route that is completely independent, i.e., each of the 6 packets of a block (5 data packets and 1 check multiple routes would be required. However, this is often impractical, and instead multiple packets must go over a common route. Still, by carefully choosing the grouping of packets per route, the chance of an unrecoverable error may be minimized. For example, as the method of FIG. 3 is capable of recovering an entire row or column, it would be logical to group each row (or column) of data packets for transmission on a common route. Therefore, in this example, only six routes would be needed, and even if one entire route was delayed or lost, all data would be recovered.

To insure that packets are not lost or delayed, preferably each group of packets from a matrix is transmitted over a different route.

Since any one route could become blocked for a number of reasons, dynamically establishing multiple, parallel routes results in a more reliable method of transmission. There are a number of considerations in implementing such a mechanism. Routes must be extracted from the Internet. When a route becomes blocked, it must be detected as soon as possible. Finally, a new alternative route must be quickly established to minimize the loss of data.

Figure 5:
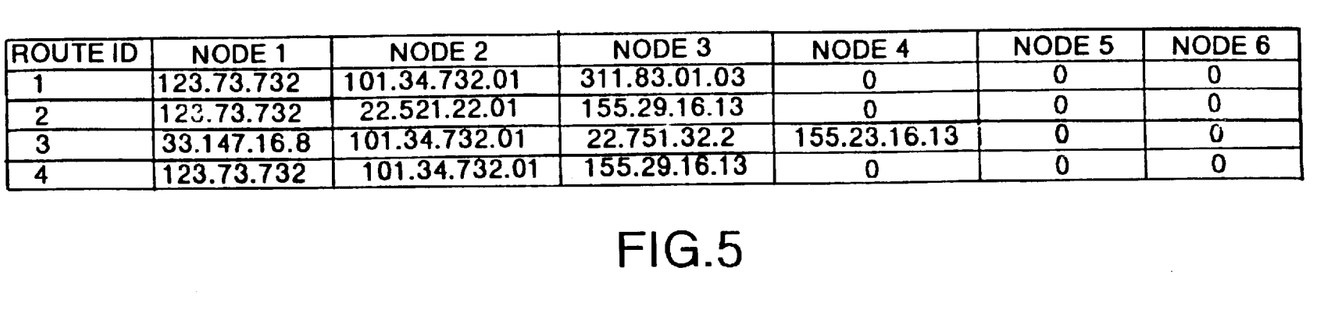
FIG. 5 illustrates an echo route packet which has traveled through a route and has recorded its intermediate node addresses and times.

To obtain a list of nodes and the transversal time between the source and destination nodes the source node (host server) creates an echo route packet and sets the Option class bit to 2 and the Option Number bit to 4 in the header for an IP packet. The echo route packet is sent by the source node to the destination node (destination host server) to collect the node IDs along its route. As that packet traverses the Internet, each node along the route inserts its IP address and a time stamp. This route is determined by the dynamics of the Internet at that time the packet is sent. FIG. 5 illustrates an echo route packet that has been received by a destination node and contains 3 pairs of IP addresses and time stamps (GMT) in milliseconds.

Echo route packet packets are sent to the destination node by the source node on a regular interval to build a table of alternative routes. When the echo route packet is received by the destination node, it is transmitted back to the source node for processing.

Figure 6:
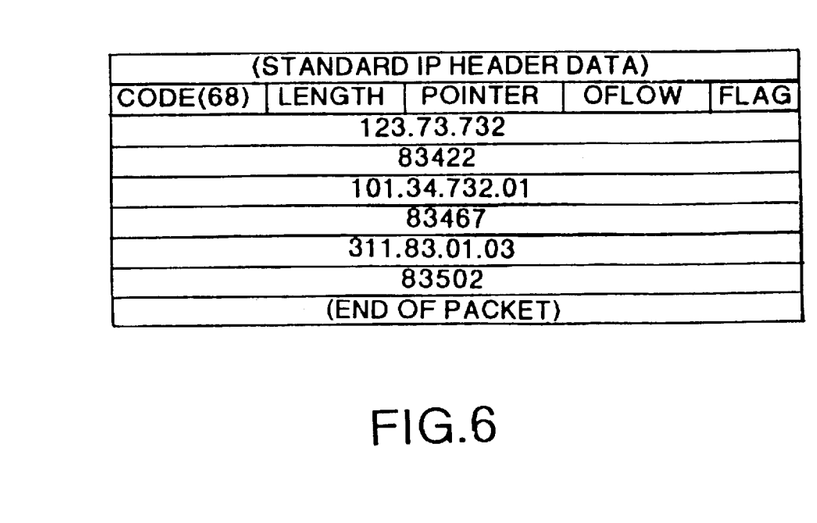
FIG. 6 illustrates a route ID (address) table maintained by a source node.

When the source node receives the echo route packet, it extracts the route and calculates the total traversal time for the packet. Each unique route taken by a packet is entered into a route ID table and given a unique route ID (see FIG. 6). FIG. 6 illustrates "strict source routing" in which the header lists all intermediate nodes (routers). Alternatively, "loose source routing" may be used in which only some of the intermediate notes are listed in the header. For a source and destination node that are a few hops apart, the potential number of routes will be small since there are only a few different routes over which a packet could be transmitted. Conversely, for source and destination nodes that are geographically far apart, the number of routes can be quite large, due to the many different routes over which a packet could be transmitted.

When a route becomes blocked, an alternative route must be quickly determined. To determine which route is the next best route, a weighting factor is preferably employed. A preferred weighting factor formula is:

$$\text{Weight} = \frac{\text{node count} * \text{time} * (\text{drop count} + 1)}{(\text{repeat count} + 1)}$$

where
  node count is the number of nodes in the route (the more nodes in the route, the greater the chance that one will block);
  time is the total traversal time from source to destination node;
  drop count is the number of times the route has been dropped (If a route has been previously dropped it is likely to be dropped again);
  repeat count is the number of times that this exact route has been returned by an echo route packet (the more times the same route is returned the greater the chances of its being reliable).

Figure 7:
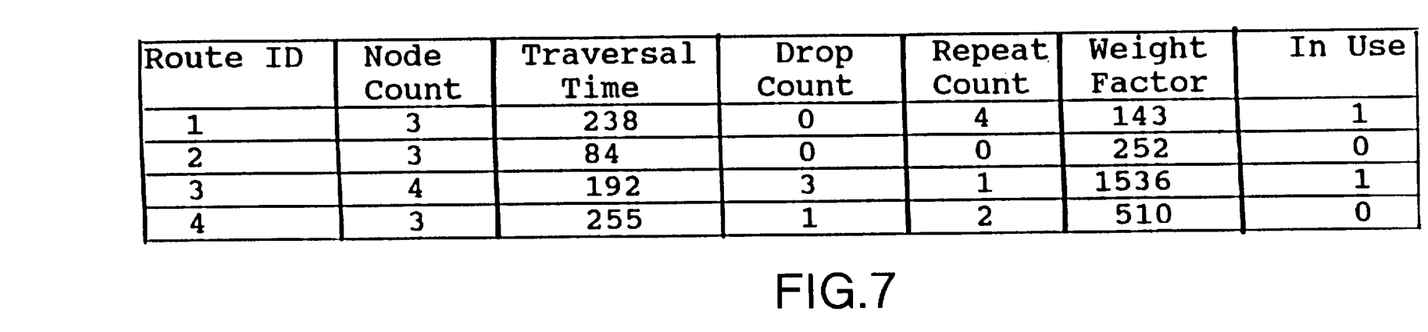
FIG. 7 illustrates a route select table maintained by a source node.

This information, along with the total reversal time, is entered into the Route Select table (see FIG. 7).

Routes other than those derived from echo route packets can also be used. For example, a route can be preconfigured by an individual that has knowledge of the topology of the Internet. Also, unique routes could be derived from routes obtained by using echo route packets. Such routes may be tested using detect route packets.

Since the Internet, at this time, does not provide a congestion feedback mechanism to the sender of data, this invention uses the destination node for this capability. The source sends a packet on a specific route (using a source route to the destination node). If the packet is not successfully returned from the destination, the route is not selected. To enable source routing for an IP packet, the source node sets the Option class bit to 0 and the Option Number bit to 9 in the IP packet.

Figure 8:
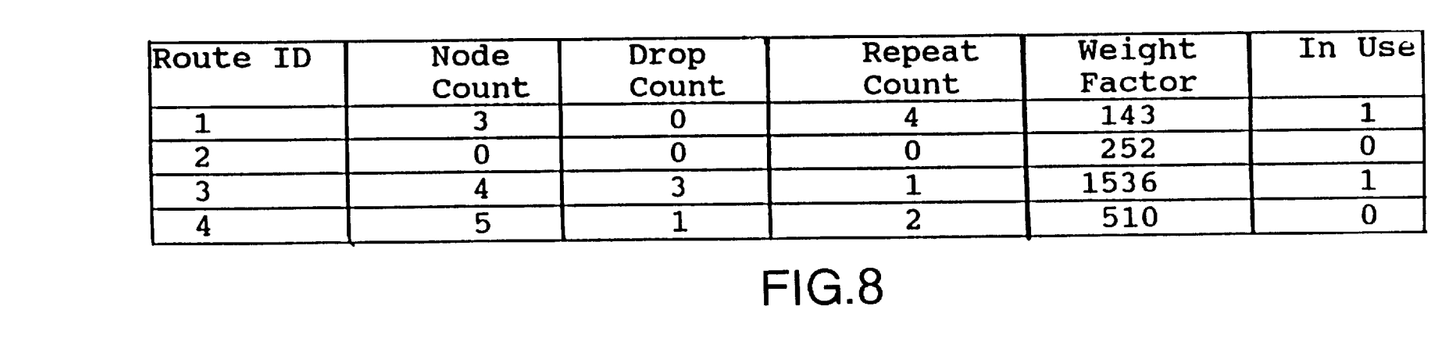
FIG. 8 illustrates a packet that has been constructed with routing information.

The header of each packet is formatted by the source node to include a list of nodes in sequence, that best determines the route over which the packet is transmitted (see FIG. 8).

What is claimed is:

1. A method of transmitting a caller's voice over the Internet from a source node to a caller's destination node, including the steps of converting the caller's voice into digital data, formatting the data into bit data packets, transmitting the data packets over the Internet and converting the data packets into sound which is a replica of the caller's voice; characterized in that the method includes the steps of:

(a) generating at the source node and transmitting a plurality of replication packets each based on the bits of a group of the data packets, the replication packets being transmitted over the Internet to the destination node along with the group of data packets;

(b) selecting a plurality of routes, each route having a sequence of intermediate nodes, and formatting a header of each data packet with a sequence of intermediate node addresses to enable each packet to be transmitted over one of the selected routes, and transmitting data packets of the caller's voice over different routes of the plurality of routes;

(c) at the destination node, detecting if any data packets are missing from the group of data packets and exactly replicating any missing data packets by computer computations using the replication packet and non-missing data packets of the group of data packets to generate replicated data packets which exactly replicate the missing packets; and (d) using the replicated data packets along with the other data packets of the group of data packets to reproduce the caller's voice.

2. The method of claim 1 wherein the conversion of the caller's voice is by a source node server computer connected by a communication line to the Internet and the method includes, at the source node formatting a group of data packets as a 2-dimensional or 3-dimensional matrix in the form of rows and columns and generating the replication packet as a row of the matrix.

3. The method of claim 2 and generating the replication packet by determining if the sum of the aligned bits of each column is an even or odd number.

4. The method of claim 1 and, at the destination node, forming each data packet group into a 2-dimensonal or 3-dimensional matrix of data packets and a plurality of replication packets so that more than one missing packet may be replicated.

5. The method as in claim 1 and transmitting an echo packet from the source node to the destination node and recording in the echo packet the address and time it is communicated at each Internet intermediate node.

6. The method of claim 5 and transmitting the recorded echo packet from the destination node to the source node.

7. The method of claim 5 and transmitting a plurality of echo packets over a plurality of routes of the Internet and determining the best available routes based on a comparison between the plurality of echo packets after said transmission.

8. The method of claim 1 wherein the caller calls from a telephone, the telephone is connected to the source node, the caller speaks to a person being called via a telephone connected to the destination mode, and the method includes the steps of claim 1 executed as to the voice of the person called so that the destination node becomes a source node and the source node becomes a destination node when the person called is speaking.

9. A system for transmitting a caller's voice over the Internet including converter means for converting a caller's voice into bits of digital data, and transmitting means for transmitting the data packets over the Internet, characterized in that the system includes:

(a) source node means for formatting and transmitting a replication packet derived from the bits of a group of data packets, the replication packet being transmitted over the Internet along with a group of data packets;

(b) means for selecting a plurality of Internet routes, each route comprising a source node; a destination node and a sequence of intermediate nodes;

(c) header formatting means for formatting a header for each packet with a sequence of intermediate node addresses to enable each packet to be transmitted over one of the selected routes;

(d) transmitting means for transmitting different packets representing the caller's voice over different routes of the selected routes;

(e) destination node means for detecting if any data packets are missing from the group of data packets and replicating the missing data packets by computations using the replication packet and non-missing data packets of the group of data packets to generate replicated data packets; and (f) sound means for reproducing the caller's voice using the replicated data packets along with the non-missing data packets of the group.

10. The system of claim 9 and means in (b) for forming a group of data packets as a 2-dimensional matrix in the form of rows and columns and forming the replication packet as a row of the matrix.

11. The system of claim 10 and means in (b) for forming the replication packet by determining if the sum of the aligned bits for each column is an even or odd number.

12. The system of claim 9 and means in (b) for forming each data packet group into a 2-dimensional or 3-dimensional matrix of data packets and a plurality of replication packets so that more than one missing packet may be replicated.

13. The system as in claim 9 and means for transmitting an echo packet form the source node to the destination mode; and recording means for recording on the echo packet the address and the time packet is transmitted from each Internet node.

14. The system of claim 13 and means for transmitting the recorded echo packet from the destination node to the source node.

15. The system of claim 14 and means for transmitting the echo packets over a plurality of routes and determining the best available routes based on the plurality of transmitted echo packets, after they have traveled the routes.

* * * * *

UNITED STATES PATENT AND TRADEMARK OFFICE
CERTIFICATE OF CORRECTION

PATENT NO. : 5,883,891
DATED : March 16, 1999
INVENTOR(S) : Joel Libove adn Wyatt Williams It is certified that error appears in the above-indentified patent and that said Letters Patent is hereby corrected as shown below:

On the title page: Item [76] Inventors:

The order of listing of the Inventors is changed to read:

JOEL LIBOVE

WYATT WILLIAMS

Signed and Sealed this

Twelfth Day of October, 1999

*Attest:*

Q. TODD DICKINSON

*Attesting Officer*      *Acting Commissioner of Patents and Trademarks*